United States Patent
Jaunet

(10) Patent No.: US 7,878,788 B2
(45) Date of Patent: Feb. 1, 2011

(54) DEVICE FOR SHEATHING A STRIP OF FILAMENTS, THE DEVICE HAVING SYMMETRICAL FEED CHANNELS

(75) Inventor: Nicolas Jaunet, Chateaugay (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 274 days.

(21) Appl. No.: 12/251,012

(22) Filed: Oct. 14, 2008

(65) Prior Publication Data
US 2009/0098236 A1    Apr. 16, 2009

(30) Foreign Application Priority Data
Oct. 11, 2007    (FR) .................................. 07 58235

(51) Int. Cl.
*B29C 47/02*    (2006.01)
(52) U.S. Cl. ...................... 425/113; 425/133.1; 425/462
(58) Field of Classification Search ................ 425/113, 425/133.1, 382.2, 462, 463
See application file for complete search history.

(56) References Cited

U.S. PATENT DOCUMENTS 4,274,821 A    6/1981    Kiemer

2005/0147702 A1    7/2005    Higashi

FOREIGN PATENT DOCUMENTS

DE    29911930 U1    1/2001
EP    0 820 848 A1    1/1998

*Primary Examiner*—Yogendra N Gupta
*Assistant Examiner*—Emmanuel S Luk
(74) *Attorney, Agent, or Firm*—Cohen Pontani Lieberman & Pavane LLP

(57) ABSTRACT

A technique for extruding a strip of rubber having filaments embedded therein. The rubber is channeled to an extrusion orifice for forming the strip. The outline of the extrusion orifice presents first and second orthogonal planes of symmetry that intersect at a straight line that is substantially parallel to a direction in which the strip is extruded through the extrusion orifice. The channeling of the rubber can be done with an upstream main channel having the first plane as a plane of symmetry, and extended by two downstream secondary channels that are substantially symmetrical to each other about the first plane. The main channel and the two downstream secondary channels also have the second plane as a plane of symmetry.

9 Claims, 3 Drawing Sheets

DEVICE FOR SHEATHING A STRIP OF FILAMENTS, THE DEVICE HAVING SYMMETRICAL FEED CHANNELS

RELATED APPLICATION

This application claims the priority of French patent application no. 07/58235 filed Oct. 11, 2007, the content of which is hereby incorporated by reference.

FIELD OF THE INVENTION

The present invention relates to a device for extruding a strip of rubber having filaments embedded therein. Such a strip is intended more particularly for use in fabricating a tire.

BACKGROUND OF THE INVENTION

Below, the term "filament" designates a filamentary element that is not necessarily a monofilament. Thus, a filament may be a multifilament element, a tow, or a ply yarn. The filament may be made of one or more materials, such as a textile material or a metal, for example. The filament may optionally be treated.

Generally, in a strip for use in fabricating a tire, the filaments are spaced apart regularly from one another and they extend in directions that are coplanar and mutually parallel.

Document U.S. Pat. No. 4,274,821 discloses a device for extruding a rubber strip of this type.

That device includes means for channeling rubber to an extrusion orifice for forming the strip.

The channeling means comprise an upstream main channel connected to a rubber feeder device, together with first and second downstream secondary channels extending the upstream main channel and connected to the extrusion orifice via an extrusion chamber.

That device also has means for guiding the filaments, which means comprise filament guide channels having ends that are upstream and downstream relative to the direction in which the strip is extruded through the extrusion orifice. The downstream end opens out into the extrusion chamber.

The extrusion orifice presents a section that is substantially rectangular, being defined by first and second directions such that the dimensions of the orifice in said first and second directions determine respectively the thickness and the width of the strip. Furthermore, the outline of the extrusion orifice presents first and second orthogonal planes of symmetry that intersect at a line that is substantially parallel to the direction in which the strip is extruded through the extrusion orifice.

Each guide channel extends between its upstream and downstream ends by following a path that is substantially rectilinear and parallel to the first plane of symmetry so that the filaments penetrate into the extrusion chamber substantially parallel to the extrusion direction.

In the extrusion chamber, the filaments are embedded, being sandwiched between the rubber as channeled in the secondary channels opening out into the extrusion chamber.

Unfortunately, head losses are generated by the rubber rubbing against the walls of each secondary channel.

Since the main channel has the first plane as its plane of symmetry and since the two downstream secondary channels are substantially symmetrical to each other about the first plane, head losses in the two mutually symmetrical streams of rubber about the first plane and following respective different secondary channels are substantially equal in each secondary channel. As a result, the section of the strip has the first plane as its plane of symmetry.

Nevertheless, since each channel extends along a path that is curved between the main channel and the extrusion chamber, head losses differ depending on the path followed by the rubber in each channel. As a result the thickness of the strip is relatively irregular.

OBJECTS AND SUMMARY OF THE INVENTION

An object of the invention is to optimize the regularity of the thickness of a strip of rubber of the kind produced by a device of the type described in U.S. Pat. No. 4,274,821.

To this end, one aspect of the invention is directed to a device for extruding a strip of rubber having filaments embedded therein, the device comprising:

channeling means for channeling the rubber to an extrusion orifice in order to form the strip, the outline of said extrusion orifice presenting first and second orthogonal planes of symmetry such that said planes intersect at a line that is substantially parallel to an extrusion direction of the strip through the extrusion orifice; and the channeling means comprise an upstream main channel having the first plane as a plane of symmetry, and extended by two downstream secondary channels that are substantially symmetrical to each other about the first plane;

wherein the main channel and the two downstream secondary channels also have the second plane as a plane of symmetry.

The strip produced by the device of the invention presents thickness that is regular. Since the main channel and the two downstream secondary channels have the second plane as a plane of symmetry, head losses are substantially the same regardless of the path followed by the rubber in each channel. Thus, the section of the strip is not only symmetrical about the first plane of symmetry, but it is also symmetrical about the second plane of symmetry and presents thickness that is relatively regular.

According to optional characteristics of the device of the invention:

the device comprises a body comprising two peripheral rubber-channeling orifices with two central portions interposed there between for channeling rubber and for guiding filaments;

the two peripheral portions are separable from each other and symmetrical to each other about at least one of the first and second planes; and the two central portions are separable from each other and symmetrical to each other about at least one of the first and second planes.

In such a body, the two peripheral portions may be substantially identical. Similarly, the two central portions may be substantially identical. This reduces diversity of the elements making up the body and makes it easier to fabricate, assemble, and maintain the device of the invention.

The device includes an extrusion chamber which preferably connects the two secondary channels to the extrusion orifice.

According to other optional characteristics of the invention:

the device comprises means for guiding the filaments and comprising filament guide channels each having a downstream end opening out into the extrusion chamber and an upstream end disposed, relative to the direction in which the strip is extruded through the extrusion orifice, downstream from an upstream end of the main channel; and each guide channel extends between its upstream and downstream ends along a curved path that is substantially parallel to the first plane of symmetry in such a manner that the filaments penetrate into the extrusion chamber substantially parallel to the extrusion direction.

These characteristics make it possible simultaneously to cause the filaments to penetrate into the extrusion chamber substantially parallel to the extrusion direction, and to channel the rubber in the channels along paths that create head losses that are relatively low and that are distributed relatively uniformly regardless of the path that is followed by the rubber in the secondary channels.

Preferably, the device includes two sets of guide channels that are substantially symmetrical to each other about the second plane of symmetry.

Advantageously, the device includes a flange for connecting the main channel to a rubber feeder device, the flange being defined by a face having provided therein an orifice forming the upstream end of the main channel.

By means of the flange, the device of the invention for extruding the strip can be connected to a rubber extruder forming a single device for feeding the extruder device with rubber. Thus, it is relatively simple to adjust the feed rate of the rubber and the extrusion speed of the strip, unlike circumstances in which a plurality of rubber extruders act simultaneously to feed the main channel or each secondary channel.

BRIEF DESCRIPTION OF THE DRAWINGS

The invention can be better understood on reading the following description given purely by way of non-limiting example and made with reference to the drawings, in which.

DETAILED DESCRIPTION OF THE DRAWINGS

Figure 1:
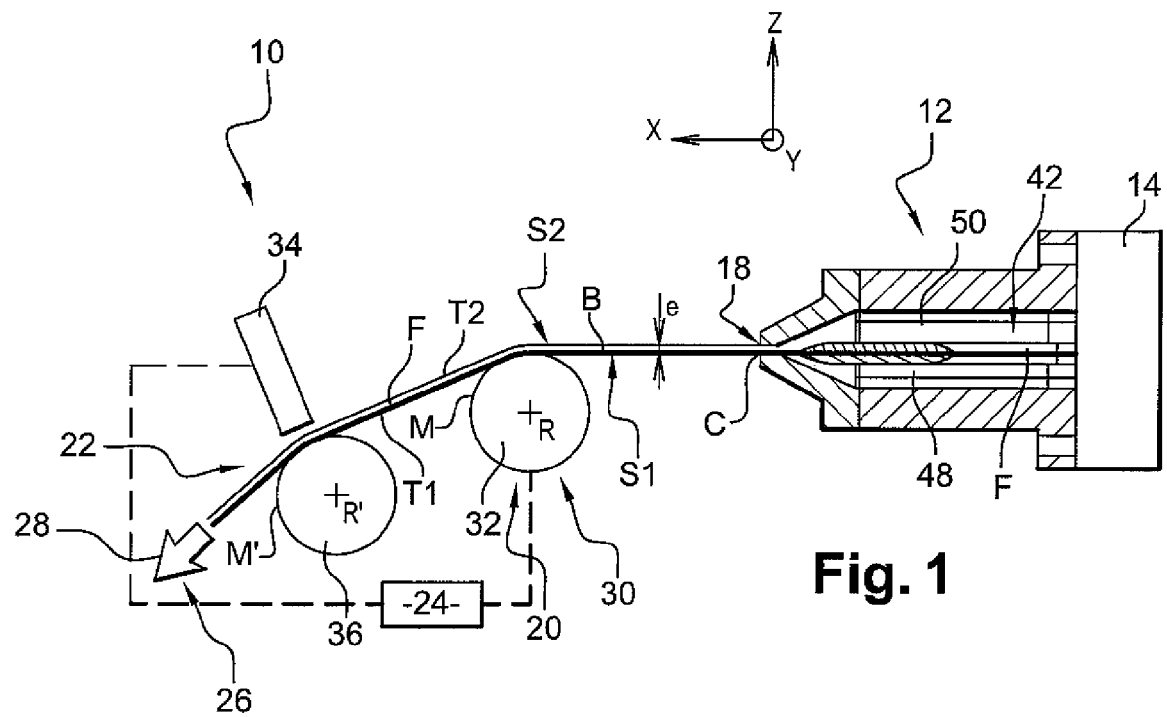
FIG. 1 is a section view of an installation for fabricating a strip of rubber.
Figure 2:
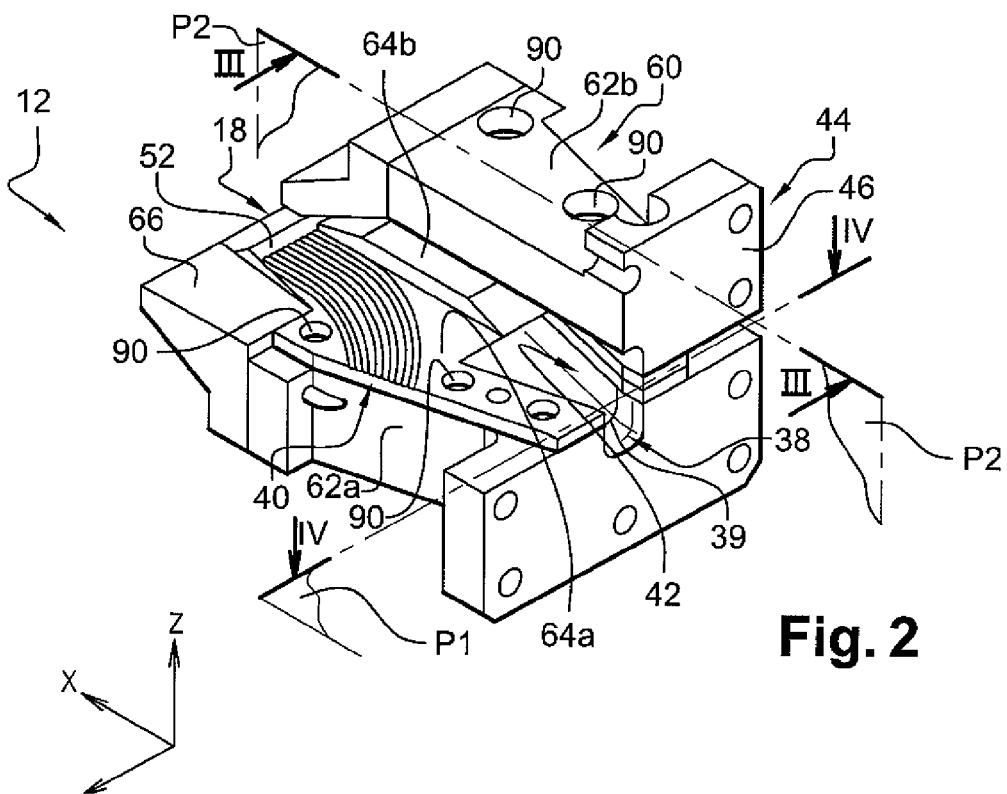
FIG. 2 is a cutaway perspective view showing a device of the invention for extruding the strip of rubber.

FIG. 1 shows an installation for fabricating a strip B of rubber in which filaments F are embedded. The installation is given overall reference 10.

The installation 10 comprises an extruder device 12 for extruding the strip B that is fed with rubber from a single device 14. The feed device 14 is constituted by a single extruder, for example.

The device 12 also includes an extrusion orifice 18 for shaping the strip B.

The figures show mutually orthogonal axes X, Y, Z. The axes Y and Z correspond respectively to transverse and vertical directions defined as being the dimensions of the orifice 18 in these directions that determine the width and the thickness e of the extruded strip B. The axis X, orthogonal to the axes Y and Z, corresponds to a longitudinal direction in which the strip B is extruded through the orifice 18. Below, reference is made to terms such as "upstream" and "downstream" relative to the direction in which the strip B is extruded through the extrusion orifice 18. In a plane substantially parallel to the plane YZ, the orifice 18 presents a section that is substantially rectangular and of outline C.

The strip B has two free faces S1, S2 that are opposite each other, substantially parallel to the plane XY, and interconnected by two mutually opposite edges T1, T2. The strip B includes filaments F embedded in the rubber, each filament extending in a direction substantially parallel to the longitudinal direction X of the strip B. The directions of the filaments F are coplanar. The filaments F are distributed transversely in regular manner.

The installation 10 also includes means 20 for moving the filaments relative to the extrusion orifice 18 in a direction that is substantially parallel to the vertical direction Z.

The installation 10 also includes means 22 for measuring the distance between the filaments F and one of the free faces S1, S2 of the strip B. These measurement means 22 are disposed downstream from the means 20 from moving the filaments F.

The installation 10 also includes means 24 for regulating the means 20 for moving the filaments F. An input of the regulator means 24 is connected to the measurement means 22 and an output of the regulator means 24 is connected to the filament mover means 20.

The installation 10 also includes means 26 for tensioning the strip B between the orifice 18 and the means 20 for moving the filaments F. These tensioning means are disposed downstream from the measurement means 22. These tensioning means 26, shown diagrammatically in FIG. 1, comprise in particular traction means 28, e.g. a storage roller around which the strip B is to be wound.

The means 20 for moving the filaments F comprise means 30 for moving the strip Br which mover means are disposed downstream from the extrusion orifice 18.

Specifically, the mover means 30 comprise a roller 32 for guiding the strip B. The roller 32 is mounted to rotate about an axis of rotation R that is substantially parallel to the transverse direction Y. The axis R is movable in a direction substantially parallel to the vertical direction Z.

In the example shown in FIG. 1, the measurement means 22 include a contactless sensor 34. The sensor 34 is preferably of the eddy current type. The measurement means 22 also include a roller 36 for supporting the strip B and arranged in register with the sensor 34. The support roller 36 is mounted to rotate about an axis of rotation R' that is substantially parallel to the transverse direction Y. The axis R' is stationary relative to the sensor 34.

The rollers 32 and 36 are provided with respective peripheral surfaces M and M' that make contact with the strip B.

FIGS. 2 to 7 show the extruder device 12 of the invention in greater detail. The extruder device 12 includes means 38 for channeling the rubber between an upstream orifice 39 for inputting rubber into the device 12, and the extrusion orifice 18 through which the strip B exits. The device 12 also has means 40 for guiding filaments F in the device 10.

Figure 3:
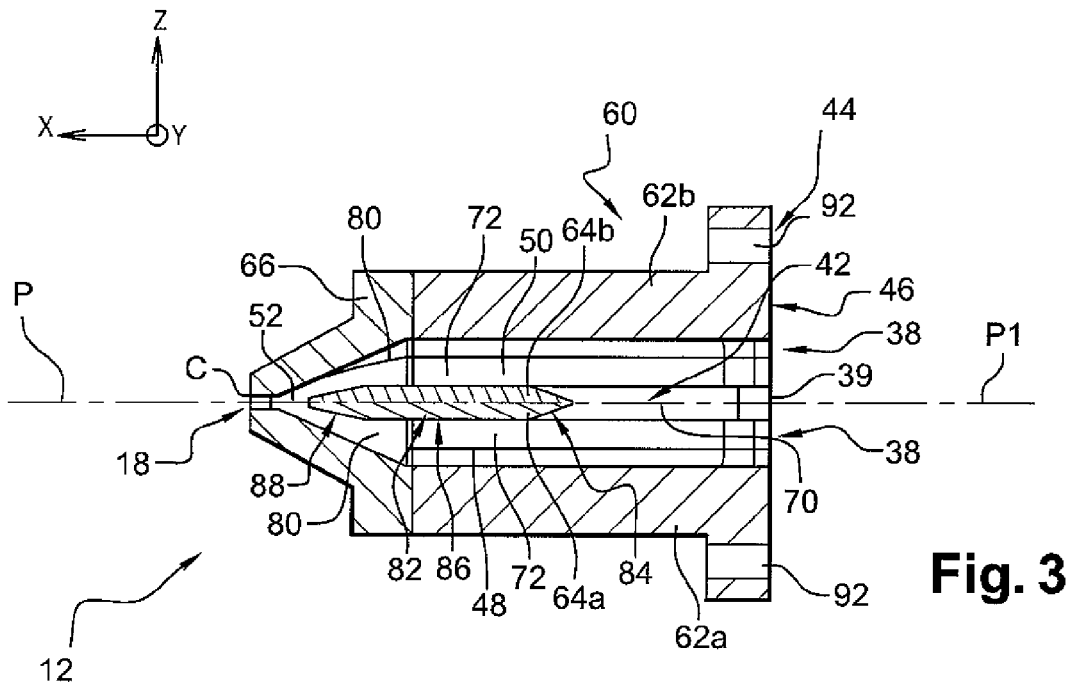
FIG. 3 is a section view of the FIG. 2 device on line III-III.
Figure 4:
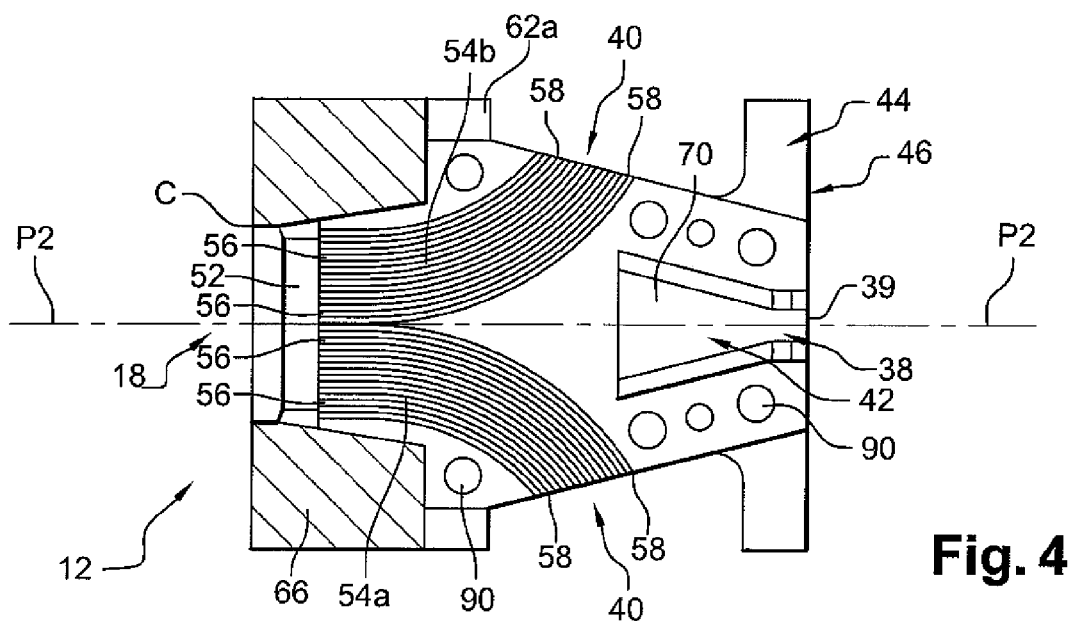
FIG. 4 is a section view of the FIG. 2 device on line IV-IV.

As shown in FIGS. 3 and 4, the channeling means 38 comprise an upstream main channel 42 for connection to the feeder device 14 by means of a flange 44. The flange 44 is defined by a face 46 in which there is located the orifice 39 that forms the upstream end of the main channel 42. The main channel 42 is designed to channel a main flow of rubber generated by the feeder device 14.

In addition, the channeling means 38 include first and second downstream, secondary channels 48, 50 extending the upstream main channel 42 and connected to the extrusion orifice 18 via an extrusion chamber 52. The first secondary channel 48 is for channeling a first stream of secondary rubber that is to form, in the extrusion chamber 52, a first portion B1 of the strip B that extends substantially between the filaments F and the free face S1. In analogous manner, the second secondary channel 50 is designed to channel a second secondary stream of rubber that is to form, in the extrusion chamber 52, a second portion B2 of the strip B that extends substantially between the filaments F and the free face S2.

Figure 7:
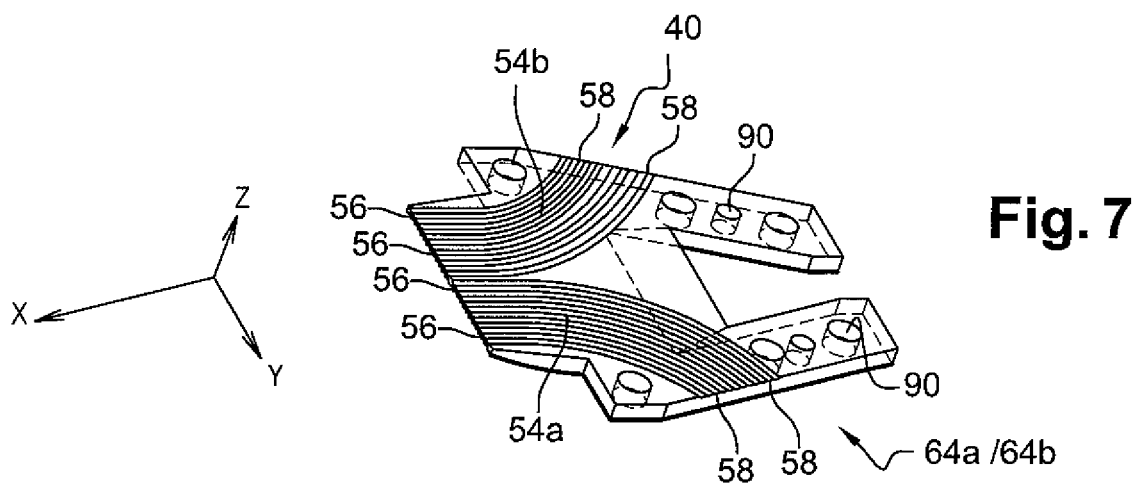
FIG. 7 is a perspective view of the central portion of the FIG. 2 device.

With reference to FIGS. 4 and 7, the means 40 for guiding the filaments F comprise two sets of guide channels 54a, 54b for guiding the filaments F. Each channel 54a, 54b is provided with a downstream end 56 that opens out into the extrusion chamber 52, and with an upstream end 58 that is disposed downstream from an upstream end of the main channel 42.

In the example shown in the figures, the device 12 has a body 60 comprising firstly two peripheral portions 62a, 62b for channeling rubber (FIG. 5), and secondly two central portions 64a, 64b for channeling rubber and for guiding filaments F (FIG. 7). The portions 64a, 64b are interposed between the portions 62a, 62b. The device 12 also has a die 66 for extruding the strip of rubber B (FIG. 6).

Specifically, and as shown in FIG. 7, each guide channel 54a, 54b presents a section that is substantially cylindrical and comprises two semicylindrical half channels formed respectively in each of the two central portions 64a and 64b.

The peripheral portions 62a, 62b are separable from each other and substantially symmetrical to each other about a first plane of symmetry P1 that is substantially parallel to the plane XY. In analogous manner, the central portions 64a, 64b are separable from each other and substantially symmetrical to each other about said first plane of symmetry P1. The die 66 is separable into portions 62a, 62b, 64a, 64b and has as planes of symmetry both the first plane P1 and a second plane P2.

The second plane P2 is substantially parallel to the plane YZ and orthogonal to the first plane P1. The straight line where the first and second planes P1 and P2 intersect is substantially parallel to the direction the strip is extruded through the extrusion orifice 18.

In addition, each portion 62a, 62b, 64a, 64b has the second plane of symmetry P2 as a plane of symmetry.

The two sets of guide channels 54a, 54b are substantially symmetrical to each other about the second plane of symmetry P2. Between the upstream and downstream ends 56, 58, each guide channel extends along a curved path.

Between the upstream and downstream ends 56, 58, each guide channel 54a, 54b extends along a curved path substantially parallel to the first plane of symmetry P1 so that the filaments F penetrate into the extrusion chamber 52 substantially parallel to the extrusion direction X, and in such a manner that the filaments F penetrate into the channels 54a, 54b substantially parallel to a direction that is inclined relative to the extrusion direction X. The paths of the channels 54a, 54b in a given set of channels are substantially parallel to one another.

Furthermore, the outline C, the main channel 42, and also the two secondary channels 48, 50 have the second plane P2 as a plane of symmetry. In addition, the outline C and the main channel 42 also have the first plane P1 as a plane of symmetry. The secondary channels 48, 50 are symmetrical to each other about the first plane P1.

Figure 5:
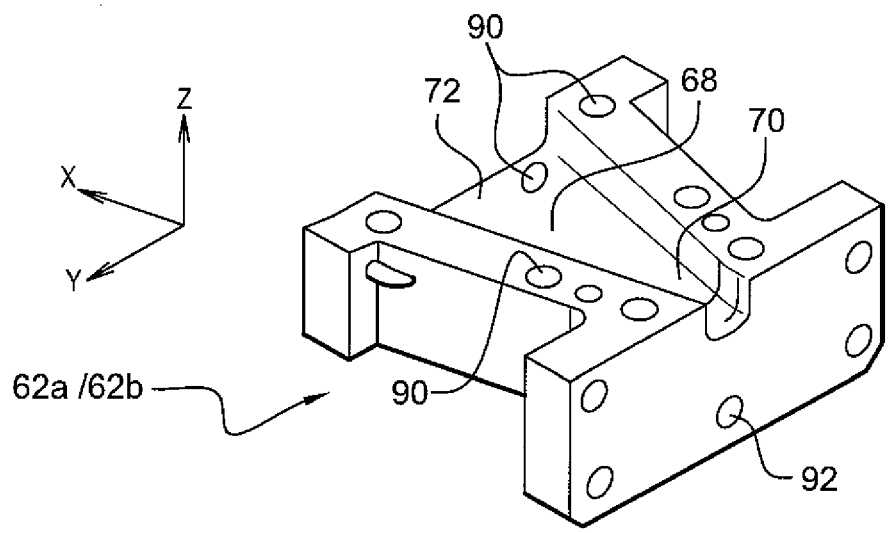
FIG. 5 is a perspective view of a peripheral portion of the FIG. 2 device.
Figure 6:
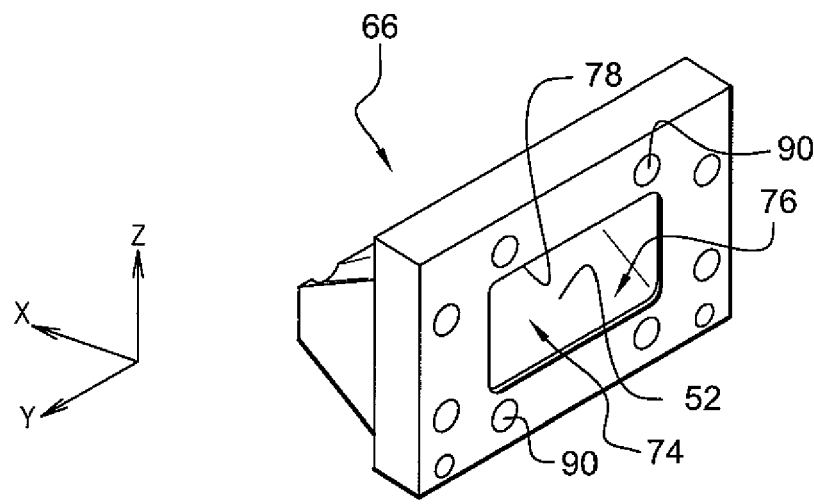
FIG. 6 is a perspective view of a die of the FIG. 2 device.

As shown in FIG. 5, each portion 62a, 62b has an internal recess 68 of frustoconical shape that is flared about the axis X, becoming larger going away from the rubber inlet orifice 39 towards the extrusion orifice 18. The recess 68 comprises two portions 70, 72. Each portion 70, arranged upstream from the portion 72, defines the main channel. Each portion 72 defines a corresponding secondary channel 48, 50.

The die 66 presents an orifice 74 defined by two walls 76, 78 that converge towards the extrusion orifice 18. The walls 76, 78 define respective portions 80 of each secondary channel 48, 50, as shown in FIG. 3. The walls 76, 78 also define the extrusion chamber 52.

With reference to FIG. 3, each central portion 64a, 64b has a channeling surface 82 defining a corresponding secondary channel 48, 50. The surface 82 has first, second, and third portions 84, 86, 88 that follow one another in that order in the extrusion direction. The first portions 84 formed in the two central portions 64a, 64b diverge in the extrusion direction. The second portions 86 formed in the two central portions 64a, 64b are substantially parallel to the first plane of symmetry P1. Finally, the third portions 88 formed in the two central portions 64a, 64b converge in the extrusion direction.

Each of the peripheral portions 62a, 62b, central portions 64a, 64b and the die 66 includes orifices 90 for passing elements for clamping together the portions 62a, 62b, 64a, 64b, and the die 66.

The flange 44 also includes orifices 92 for passing clamping elements in order to connect the device 12 to the feeder device 14.

The installation 10 serves to implement a method of fabricating a strip of rubber B, and there follows a description of the main aspects thereof that are associated with the invention.

In order to fabricate the strip B the device 12 is fed with rubber by the device 14. The filaments F are guided in the channels 54a, 54b and are put under tension between the orifice 18 and the roller 32 by using the traction means 28.

The strip of rubber B is extruded through the extrusion orifice 18 and the distance between the filaments F and the free face S1 is regulated. For this purpose, the distance between the filaments F and the free face S1 is measured, i.e. the thickness of the portion B1 of the strip B is measured.

The sensor 34 measures the distance between the sensor 34 and the filaments F. The thickness e1 of the portion B1 of the strip B is substantially equal to the distance between the filaments F and the free face S1 in contact with the surface M' of the roller 36. Given the distance between the sensor 34 and the surface M', the measured distance between the sensor 34 and the filaments F is used to deduce the distance between the filaments F and the surface S1 in contact with the surface M'. Assuming that the total thickness e of the strip is constant, it is also possible to deduce a thickness e2 for the portion B2 of the strip B.

Depending on the values for e1 or e2, the strip B is moved downstream from the extrusion orifice 18 in a direction that is substantially parallel to the vertical direction Z. With reference to FIG. 1, if the distance measured between the filaments F and the free face S1 departs from a predetermined setpoint, then the regulator means 24 cause the means 30 for moving the strip B to move the axis R of the roller 32 in the appropriate direction.

The invention is not limited to the above-described embodiment.

The free faces S1, S2 need not be plane, and they need not be parallel to each other.

In addition, the guide channels 54a, 54b could present dimensions that vary and that are adapted to the dimensions of the filaments embedded in the rubber. Furthermore, the channels could be spaced apart to a greater or lesser extent and they could be disposed transversely in relatively irregular manner.

What is claimed is:

1. A device for extruding a strip of rubber having filaments embedded therein, the device comprising:

channeling means for channeling the rubber to an extrusion orifice in order to form the strip, the outline of said extrusion orifice presenting first and second orthogonal planes of symmetry such that said planes intersect at a line that is substantially parallel to an extrusion direction of the strip through the extrusion orifice; and the channeling means comprise an upstream main channel having the first plane as a plane of symmetry, and extended by two downstream secondary channels that are substantially symmetrical to each other about the first plane;

wherein the main channel and the two downstream secondary channels also have the second plane as a plane of symmetry.

2. The device according to claim 1, including a body comprising two peripheral rubber-channeling orifices with two central portions interposed there between for channeling rubber and for guiding filaments.

3. The device according to claim 2, wherein the two peripheral portions are separable from each other and symmetrical to each other about at least one of the first and second planes.

4. The device according to claim 2, wherein the two central portions are separable from each other and symmetrical to each other about at least one of the first and second planes.

5. The device according to claim 1, including an extrusion chamber connecting the two secondary channels to the extrusion orifice.

6. The device according to claim 5, including means for guiding the filaments and comprising filament guide channels each having a downstream end opening out into the extrusion chamber and an upstream end disposed, relative to the direction in which the strip is extruded through the extrusion orifice, downstream from an upstream end of the main channel.

7. The device according to claim 6, wherein each guide channel extends between its upstream and downstream ends along a curved path that is substantially parallel to the first panel of symmetry in such a manner that the filaments penetrate into the extrusion chamber substantially parallel to the extrusion direction.

8. The device according to claim 6, including two sets of guide channels that are substantially symmetrical to each other about the second plane of symmetry.

9. The device according to claim 6, including a flange for connecting the main channel to a rubber feeder device, the flange being defined by a face having provided therein an orifice forming the upstream end of the main channel.

* * * * *